Figure 1:
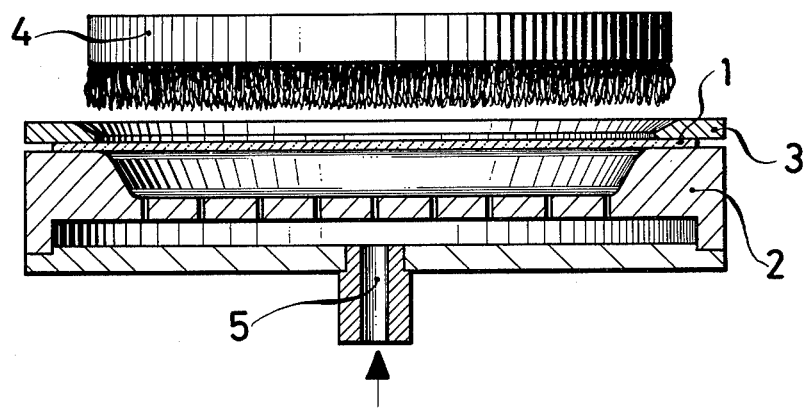

United States Patent [19]

Juras

[11] 4,313,746
[45] Feb. 2, 1982

[54] PROCESS FOR MAKING FORMED GLASS FROM PLATE GLASS

[75] Inventor: Karl-Heinz Juras, Mainz-Mombach, Fed. Rep. of Germany

[73] Assignee: Jenaer, Glaswerk, Schott & Gen., Fed. Rep. of Germany

[21] Appl. No.: 193,409

[22] PCT Filed: Jul. 21, 1979

[86] PCT No.: PCT/DE79/00076
§ 371 Date: Apr. 3, 1980
§ 102(e) Date: Apr. 3, 1980

[87] PCT Pub. No.: WO80/00336
PCT Pub. Date: Mar. 6, 1980

[30] Foreign Application Priority Data
Aug. 9, 1978 [DE] Fed. Rep. of Germany ....... 2834867

[51] Int. Cl.³ .......................................... C03B 23/025
[52] U.S. Cl. ..................................... 65/25.4; 65/106; 65/107

[58] Field of Search .......................... 65/25.4, 106, 107

[56] References Cited
U.S. PATENT DOCUMENTS

| 2,377,946 | 6/1945 | Leary | 65/107 UX |
| 2,970,405 | 2/1961 | Giffen | 65/107 X |
| 3,177,060 | 4/1965 | Pedersen | 65/106 |
| 3,181,563 | 5/1965 | Giffen | 65/106 X |
| 3,607,186 | 9/1971 | Bognar | 65/107 X |

Primary Examiner—Arthur D. Kellogg
Attorney, Agent, or Firm—Quaintance & Murphy

[57] ABSTRACT

For the manufacture of formed parts made of glass, as for example, grill gratings or grease pans for kitchenstoves, a piece of plate glass that is cut to size is placed on a mold which corresponds to the shape of the desired piece of glass; and is heated. In order to prevent a premature lowering of the softening piece of plate glass, during the softening process, it is supported by a gas cushion.

6 Claims, 2 Drawing Figures

PROCESS FOR MAKING FORMED GLASS FROM PLATE GLASS

Until now, plate glass has been formed by placing a plate cut to the corresponding size on a corresponding mold, heating it and lowering it by means of its own weight into or onto the mold, in which case the lowering was, if required, also aided by molding tools. This can only result in a relatively low degree of forming, as it is, for example, required for the manufacture of full-view windshields for automobiles. In the case of said process, the mold and the glass reach the same temperature; the glass must not be heated too much in order not to stick. Separating agents must be added between the mold and the glass; or the mold must be covered by a material that does not imprint itself on the glass, for example, glass fiber textile.

In other processes, the glass is sucked into a mold in order to accelerate the forming process. This results in a high degree of forming, but the wall-thickness distribution is very unsatisfactory, because at the points where the glass is supported during the heating, a cooling effect takes place that cannot be overcome by the heat source. The cooling effect increases in direct proportion to the temperature difference between the glass and the mold. The higher the desired degree of forming, the more the glass must be heated. However, the adhesion temperature cannot be increased to the same extent. Thus the cooling effect is the larger, the larger the degree of forming. Heavy articles, for example, a glass grating of a quality that is sufficient for use, can also not be manufactured by means of this process.

The objective of this invention is a process for the shaping of plate glass that avoids the described disadvantages of the customary processes.

This goal is reached by means of the process of the present invention.

In the process according to the invention, the glass plate to be shaped is placed on the mold in such a way that it touches the mold only at the edge, and the hollow space enclosed by the glass plate and the mold is largely sealed off. During the heating of the plate an excess pressure is generated in the hollow space which prevents the glass from settling on protruding parts of the mold and when its viscosity decreases. In this manner, the glass can be brought to the lower viscosity that is required for the forming. As soon as it is reached, the hollow space is vented and evacuated. The atmospheric pressure brings the plastic glass into the desired shape. The distribution of the thickness is not impaired by prior cooling; a high degree of shaping with a good distribution of thickness is possible.

The process may also be carried out by blowing and/or sucking the softened glass plate that is carried by the gas cushion into a mold that is located above the glass plate, in which the glass plate is shaped.

Figure 2:
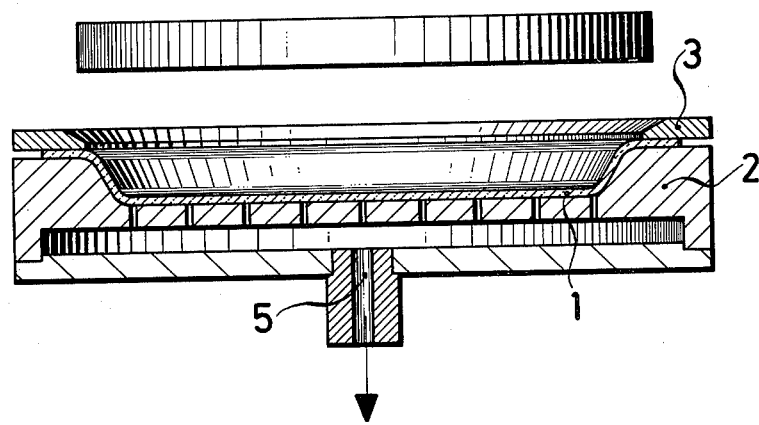

In the following, the invention is described in detail by means of an embodiment;

FIG. 1 is a sectional view through a mold useful in practicing the process of the present invention with a plate glass during the heating of the glass plate, and FIG. 2 is a sectional view through the same mold after lowering the softened glass plate.

EXAMPLE

For the manufacture of a grill grating that has the shape of a wash-board, a plate glass 1 made of Duran 50 measuring 410×340×3 mm is placed on a mold 2 having a rectangular periphery that was preheated to about 550° C.

A cover ring (pressure frame) 3 is then placed on the glass plate 1 and is subjected to a pressure of about 10 kp.

Then the burners 4 located above the mold are lit, and the glass plate 1 is heated to about 900° C.

As soon as the glass starts to soften, compressed air is blown through a borehole 5 at the bottom of the mold 2 in a sufficient amount in order to prevent a lowering of the softening plate 1. Only when the plate 1 reaches the degree of softening that is required for the shaping, is the hollow space between the mold 2 and the plate 1 made pressureless, and by using a sub-atmospheric pressure (0.6 bar), the lowering of the softened glass plate 1 and its contact with the profile of the mold is advanced.

I claim:

1. A process for making formed glass from plate glass, wherein a cut-to-size piece of plate glass is heated and lowered into a mold, and wherein during the heating, the softening piece of plate glass is prevented from lowering itself, the improvement consisting in that the piece of plate glass, during the heating, is carried by a gas cushion at super-atmospheric pressure, and that thereafter the lowering of the softened piece of plate glass is accelerated by using a vacuum in the hollow space between the mold and the piece of plate glass.

2. A process for making formed glass from plate glass comprising the steps of:
   I. placisng a piece of plate glass having a flat lower surface onto flat upper surface of a convex mold; and
   II. sealing the interface between the lower surface of the piece of plate glass and the upper surface of the mold in order to make it airtight thereby defining a space between the mold and the piece of plate glass; and
   III. supplying a fluid at super atmospheric pressure to the space between the mold and the piece of glass while simultaneously heating the piece of glass to a temperature sufficiently above the softening temperature such that the glass would settle of its own weight but for the super atmospheric pressure below the piece of glass; and then
   IV. venting and evacuating the space between the piece of glass and the mold to produce a sub-atmospheric pressure within the space whereby the piece of glass is caused to conform to the shape of the mold.

3. Procedure according to claim 1, wherein the piece of plate glass is pressed from above forming a relatively airtight seal between the edge of the mold and the surface of the piece of plate glass which contacts the mold.

4. Procedure according to claim 3, wherein a mold is used having a heat resistant edge seal.

5. Procedure according to claim 1 wherein an edge seal conforming to the edge of the mold is set on the piece of plate glass which was placed on the edge of the mold.

6. Procedure according to claim 1 wherein a gas cushion is produced by blowing a gas through bore openings in the mold into the space between the mold and the flat glass plate.

* * * * *